(12) United States Patent
Talisman

(10) Patent No.: US 6,227,563 B1
(45) Date of Patent: May 8, 2001

(54) AIRBAG RESPONSIVE SEAT RELEASE SAFETY SYSTEM

(76) Inventor: Rueben Talisman, 12106 Pine Brook Dr., Stafford, TX (US) 77477

( * ) Notice: Subject to any disclaimer, the term of this patent is extended or adjusted under 35 U.S.C. 154(b) by 0 days.

(21) Appl. No.: 09/303,535

(22) Filed: Apr. 30, 1999

(51) Int. Cl.$^7$ .............................. B60R 21/32; B60N 2/02
(52) U.S. Cl. .............. 280/735; 297/216.15; 297/216.18; 296/68.1
(58) Field of Search .................. 297/216.15, 216.18; 280/735; 296/68.1

(56) References Cited

U.S. PATENT DOCUMENTS

| | | | | |
|---|---|---|---|---|
| 3,858,930 | * | 1/1975 | Calandra et al. | 296/68.1 |
| 3,992,046 | * | 11/1976 | Braess | 296/68.1 |
| 4,552,381 | * | 11/1985 | Schlanger | 296/65 A |
| 5,074,583 | * | 12/1991 | Fujita et al. | 280/735 |
| 5,125,472 | * | 6/1992 | Hara | 180/271 |
| 5,344,204 | * | 9/1994 | Liu | 296/68.1 |
| 5,626,203 | * | 5/1997 | Habib | 297/216.18 |
| 5,746,467 | * | 5/1998 | Jesadanont | 296/68.1 |
| 5,748,473 | * | 5/1998 | Breed et al. | 280/735 |
| 5,803,491 | * | 9/1998 | Barnes et al. | 296/68.1 |
| 5,810,417 | * | 9/1998 | Jesadanont | 296/68.1 |
| 5,813,726 | * | 9/1998 | Husted | 296/68.1 |
| 5,822,707 | * | 10/1998 | Breed et al. | 296/65.1 |
| 5,947,543 | * | 9/1999 | Hubbard | 296/68.1 |

* cited by examiner

*Primary Examiner*—Lanna Mai
*Assistant Examiner*—Jeff Restifo
(74) *Attorney, Agent, or Firm*—Kenneth A. Roddy

(57) ABSTRACT

An airbag seat release system that releases the front seat mounted in a vehicle to move upon deployment of an airbag in the vehicle. The release system includes an actuator connected with a latch mechanism on the seat assembly powered by an electrical signal supplied by the airbag deployment circuit. The latch mechanism is movable between a normally latched position preventing movement of the seat and a released position allowing movement of the seat relative to the vehicle. Upon deployment of the airbag, the actuator is activated responsive to the electrical signal to move the latch to the released position allowing the seat to move relative to the vehicle as the airbag is deployed. A ram connected with the seat assembly simultaneously propels the seat rearward. A stop member controls the extent of movement of the seat and backrest. The release system may have a latch connected with the seat mounting rails to enable the seat and backrest to slide as a unit in the released position, a latch connected between the seat and backrest to enable the backrest to pivot relative to the seat in the released position, or may have both a latch connected with the seat mounting rails and a latch connected between the seat and the backrest to enable the seat to slide as a unit and the backrest to pivot relative to the seat in the released position.

3 Claims, 4 Drawing Sheets

AIRBAG RESPONSIVE SEAT RELEASE SAFETY SYSTEM

BACKGROUND OF THE INVENTION

1. Field of the Invention

This invention relates generally to vehicle airbags, and more particularly to an airbag seat release safety system that allows the front seat of the vehicle and/or backrest of the seat to move upon deployment of the airbag.

2. Brief Description of the Prior Art

Vehicle airbags are supplemental restraint systems that inflate very rapidly upon the vehicle being involved in a collision of sufficient magnitude to provide a cushion between the occupant and the steering wheel and interior surfaces of the vehicle. The driver's side bag is mounted in the steering wheel and the passenger bag is mounted on the dashboard on the passenger side of the vehicle.

When the vehicle is involved in a frontal collision at a speed of from about 12–15 mph, the sudden deceleration of the vehicle causes two crash sensors to send an electrical signal to a diagnostic module that self tests to confirm that a crash event is taking place and, if such is confirmed, then allows the signal to trigger the airbag deployment. All of this takes place in about 30 milliseconds, and the entire inflation/deflation cycle takes place in less than ½ second. The speed of the airbag inflating is about 200 mph. The airbag deployment force is greatest in the first 2–3 inches after the airbag begins to inflate and the force decreases as the airbag inflates farther.

Although the airbag is effective in saving many lives, many people receive bruises, cuts, abrasions, broken bones, and serious injuries, and some people are even killed, due to the explosive inflation of the airbag itself. Most serious airbag inflation injuries are caused because the occupant was too close to the airbag when it started to deploy due to the distance between the occupant and the steering wheel or dashboard when the vehicle is being driven. The front seat of the vehicle is normally fixed in the vehicle to prevent movement, thus when a crash occurs, the occupant is thrown violently forward as the airbag begins to inflate with explosive force.

There are several patents that disclose various seat release mechanisms and airbag systems.

Husted, U.S. Pat. No. 5,813,726 discloses an inertia locking device for a mechanical seat fore and aft and backrest adjuster mechanism which automatically locks the seat adjustment mechanism to prevent movment of the seat and backrest in the event of a vehicle collision.

Barnes et al, U.S. Pat. No. 5,803,491 discloses a disabling system for an inflatable airbag restraint system that automatically disables deployment of the airbag when the seat is moved forward of a predetermined seat position and enables deployment of the airbag when the seat is moved rearward of the predetermined seat position.

Fujita et al, U.S. Pat. No. 5,074,583 discloses an airbag system for vehicles including a seating condition sensor that detects the seating condition of a passenger, the seat position, reclining angle, passenger size, and posture, and a control unit that controls the operation of the airbag in accordance with the seating condition of the passenger so that the inflated airbag is brought into optimal contact with the passenger.

The present invention is distinguished over the prior art in general, and these patents in particular by an airbag seat release system that releases the front seat mounted in a vehicle to move upon deployment of an airbag in the vehicle. The release system includes an actuator connected with a latch mechanism on the seat assembly powered by an electrical signal supplied by the airbag deployment circuit. The latch mechanism is movable between a normally latched position preventing movement of the seat and a released position allowing movement of the seat relative to the vehicle. Upon deployment of the airbag, the actuator is activated responsive to the electrical signal to move the latch to the released position allowing the seat to move relative to the vehicle as the airbag is deployed. A ram connected with the seat assembly simultaneously propels the seat rearward. A stop member controls the extent of movement of the seat and backrest. The release system may have a latch connected with the seat mounting rails to enable the seat and backrest to slide as a unit in the released position, a latch connected between the seat and backrest to enable the backrest to pivot relative to the seat in the released position, or may have both a latch connected with the seat mounting rails and a latch connected between the seat and the backrest to enable the seat to slide as a unit and the backrest to pivot relative to the seat in the released position.

SUMMARY OF THE INVENTION

It is therefore an object of the present invention to provide an airbag responsive seat release safety system that will significantly reduce airbag inflation injuries caused because the occupant was too close to the airbag when it started to deploy.

It is another object of this invention to provide an airbag seat release safety system that allows the front seat of a vehicle to move upon deployment of the vehicle airbag.

Another object of this invention is to provide an airbag seat release safety system that allows the backrest of a vehicle seat to move upon deployment of the vehicle airbag.

Another object of this invention is to provide an airbag seat release safety system that releases the vehicle seat slide and backrest tilt angle latching mechanisms simultaneously upon deployment of the vehicle airbag.

A further object of this invention is to provide an airbag responsive seat release safety system that may be retrofitted to vehicles having an existing airbag supplemental restraint system, or may be provided as a factory option on new vehicles.

A still further object of this invention is to provide an airbag responsive seat release safety system that is simple in construction, inexpensive to manufacture, and rugged and reliable in operation.

Other objects of the invention will become apparent from time to time throughout the specification and claims as hereinafter related.

The above noted objects and other objects of the invention are accomplished by an airbag seat release system that releases the front seat mounted in a vehicle to move upon deployment of an airbag in the vehicle. The release system includes an actuator connected with a latch mechanism on the seat assembly powered by an electrical signal supplied by the airbag deployment circuit. The latch mechanism is movable between a normally latched position preventing movement of the seat and a released position allowing movement of the seat relative to the vehicle. Upon deployment of the airbag, the actuator is activated responsive to the electrical signal to move the latch to the released position allowing the seat to move relative to the vehicle as the airbag is deployed. A ram connected with the seat assembly simultaneously propels the seat rearward. A stop member controls the extent of movement of the seat and backrest. The release system may have a latch connected with the seat mounting rails to enable the seat and backrest to slide as a unit in the released position, a latch connected between the seat and backrest to enable the backrest to pivot relative to the seat in the released position, or may have both a latch connected with the seat mounting rails and a latch connected between the seat and the backrest to enable the seat to slide as a unit and the backrest to pivot relative to the seat in the released position.

DESCRIPTION OF THE PREFERRED EMBODIMENT

Figure 1:
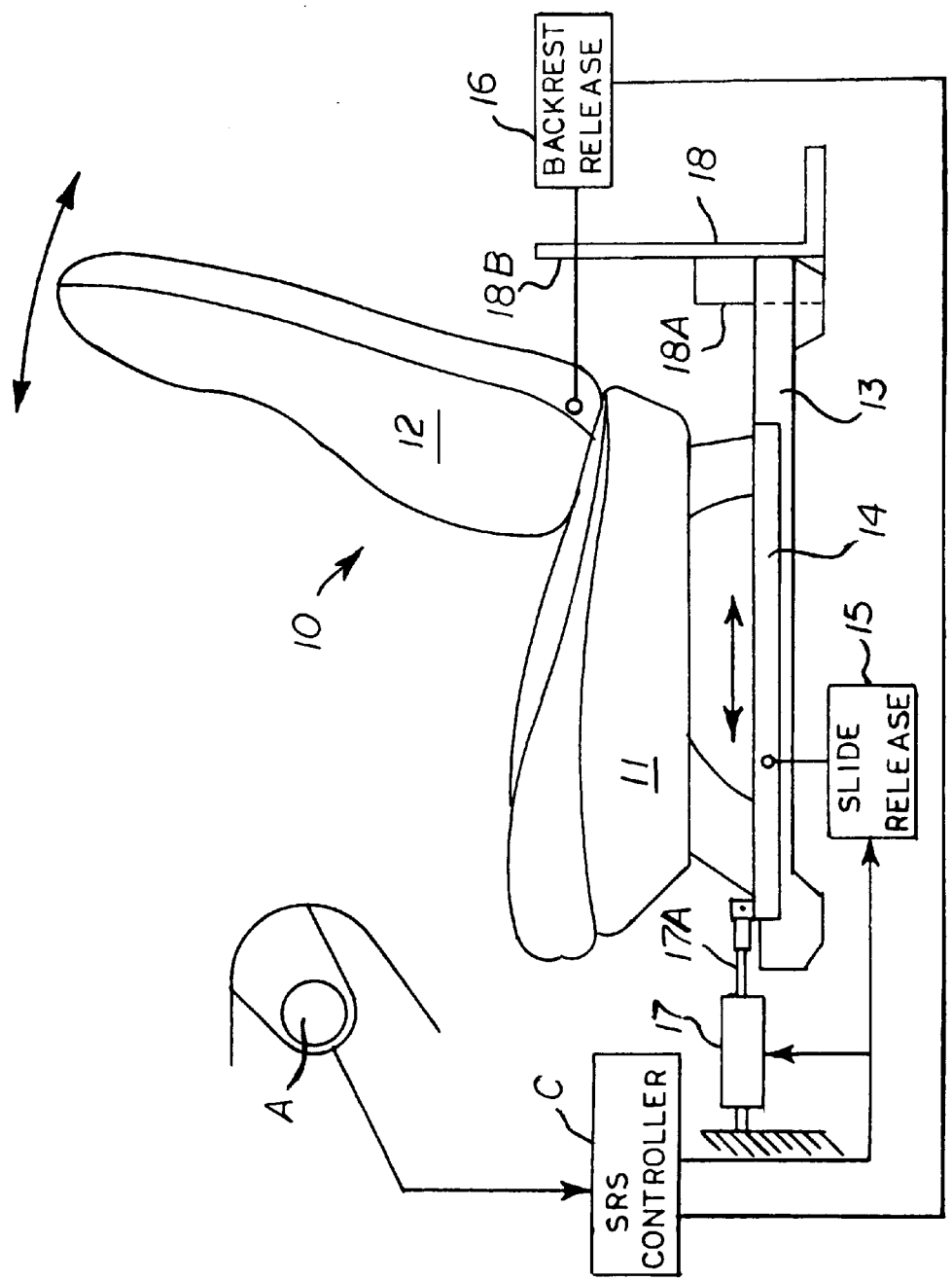
FIG. 1 is a schematic diagram of the airbag responsive seat release safety system in accordance with the present invention.

Referring to the drawings by numerals of reference, there is shown in FIG. 1, a schematic diagram of the airbag responsive seat release safety system in accordance with the present invention installed on a typical front seat 10 of a vehicle. The seat 10 has a horizontal seat portion 11 and an adjustable backrest portion 12 and is slidably mounted on a lower rail 13 which is attached to the vehicle body through a pedestal or or other mount. The lower rail 13 is secured in a fore and aft direction along the longitudinal axis of the vehicle. An upper rail 14 attached to the seat portion is slidably mounted to the lower rail 13 for fore and aft movement thereon. The backrest portion 12 is adjustable to vary in angular position relative to the seat portion 12, and the seat cushion and backrest can be moved fore and aft as a unit, but are normally latched in a non-movable condition. The seat release safety system in accordance with the present invention may include a track slide release actuator 15 and/or a backrest release actuator 16 connected to the seat latch mechanism and the backrest latch mechanism, respectively.

A ram 17 is secured to the vehicle body and has an extendible piston rod 17A connected to the upper rail 14. A stop member 18 is secured at the rear end of the lower rail 13 and has a lower stop surface 18A positioned to engage the upper rail 14 to control the extent of its rearward movement and an upper stop surface 18B positioned to engage the backrest 12 to control the extent of its pivotal reclining movement.

Inflatable airbags and inflators A mounted in the steering wheel (not shown in FIG. 1) and passenger side of the dashboard are controlled by an SRS (supplemental restraint system) control circuit C. The inflators A are activated upon receiving a signal indicating a predetermined amount of vehicle deceleration in the fore-aft direction to inflate the airbags. The track slide release actuator 15 and/or the backrest release actuator 16, and the ram 17 are activated upon the SRS control circuit C sending a signal to the airbag actuator to inflate the airbags.

Figure 2:
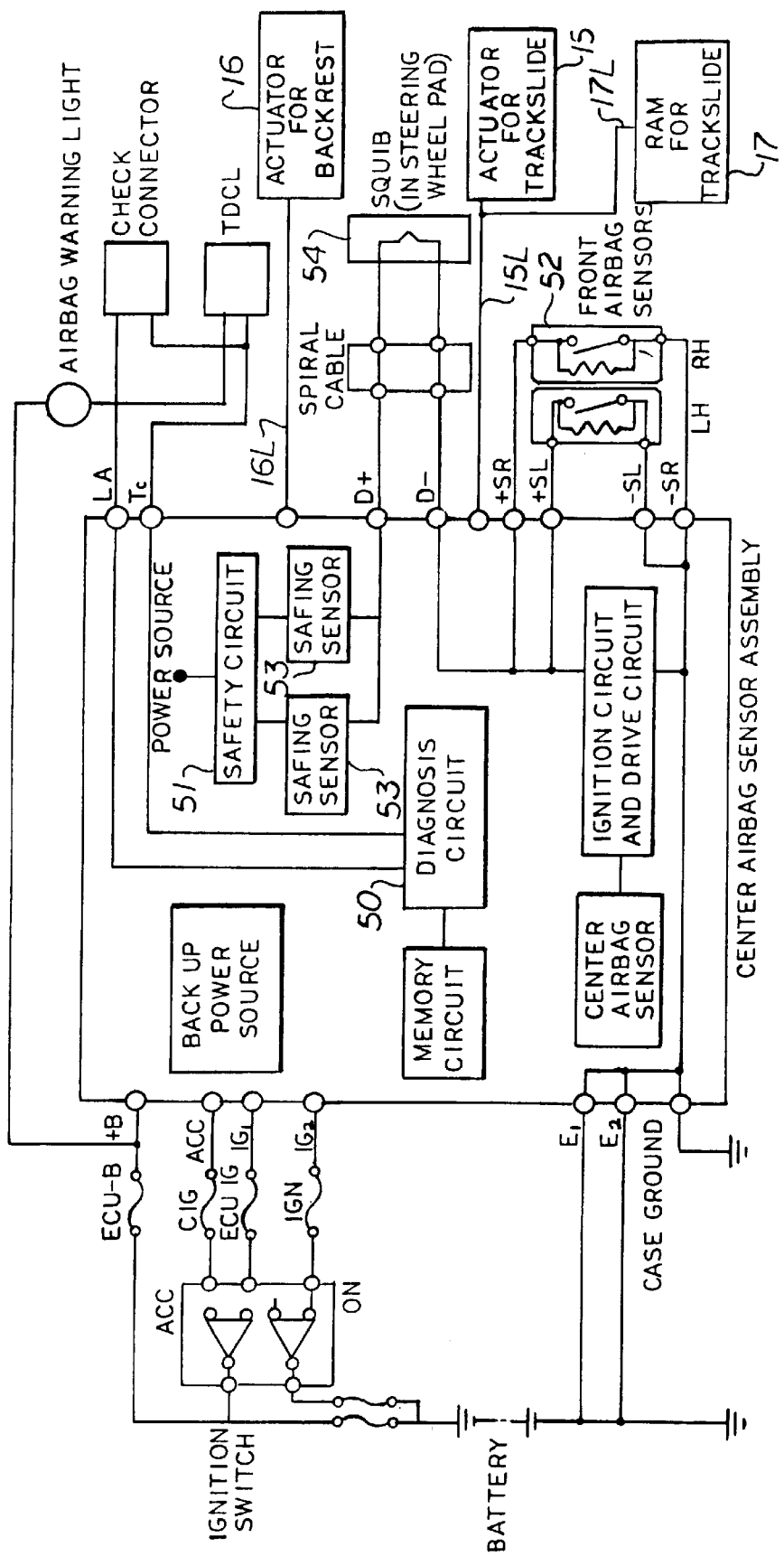
FIG. 2 is a schematic electrical wiring diagram of a typical airbag deployment control circuit of the present invention.

Referring now to FIG. 2, there is shown a schematic electrical wiring diagram of a conventional airbag control circuit C for controlling the deployment of the airbag. The illustrated wiring diagram for the airbag control circuit is conventional in the art and therefore all of the electrical components and their connections will not be described in detail. The seat release safety system in accordance with the present invention may be operated by an electrical signal generated by any conventional airbag control circuit system.

The airbag deployment control circuit C includes crash sensors that work with a diagnosis circuit 50 and a safety circuit 51 to discriminate between crash and non-crash events. The airbag deployment circuit incorporates at least one forward impact sensor 52 and at least one rear impact sensor 53 that interact before airbag deployment. Conventional crash sensors utilize a ball and magnet or a spring band and roller mechanism to close a contact.

The forward or front sensors 52 are located in various locations forward of the passenger compartment. Depending upon the make of the vehicle, the front sensors 52 may be located inside the fenders, on the cowl, or attached to the core support in front of the radiator. The rear crash sensors 53 are also known as "safing sensors" and their function is to determine that a crash has occured. The rear safing sensors 53 are located in various locations in the passenger compartment depending upon the vehicle manufacturer. In some makes, the safing sensors 53 are intergrated with the control/diagnostic module. The rear safing sensors 53 must close before the front sensors 52 to avoid airbag deployment in cases where the impact is not severe enough to cause deployment.

The front sensors 52 measure the severity of the impact, and are set up so that sudden deceleration will cause their contacts to close, sending a signal to the control circuit which checks for a signal from the rear sensors 53 which must arrive first to activate the airbag(s).

When the crash sensors 52 and 53 activate the airbag assembly, an electric current is sent to the inflator assembly which rapidly inflates the airbag with a gas. Most conventional inflator assemblies include a squib or detonator 54 which ignites a quantity of sodium adzide pellets. When the sodium adzide pellets burn nitrogen gas is released very quickly and in large quantities to inflate the airbag.

The track slide release actuator 15 and/or the backrest release actuator 16 and the ram 17 of the present invention are connected by leads 15L, 16L and 17L, respectively, to the electrical leads D+ and D- that supply the electrical signal to the inflator assembly (squib 24 or detonator) that ignites the sodium adzide pellets to release the nitrogen gas and fill the airbag. It should be understood that the sodium adzide pellets are described as an example, and that other suitable materials may be used to produce a gas to inflate the airbag.

The actuators 15 and 16 are preferably electric solenoids having an extensible and retractable plunger, however, the actuators may also be hydraulic or pneumatic rams connected with a source of pressurized fluid through an electrically operated valve, or may be a ram containing an small explosive charge and an electrical detonator which ignites the charge to release a gas very quickly to extend or retract a plunger. The ram 17 preferably contains a small explosive charge (such as sodium adzide pellets) connected with an electrical detonator which ignites the charge to release a gas very quickly to extend its piston rod 17A. It should be understood that sodium adzide pellets are described as an example, and that other suitable materials may be used to produce a gas to move the piston rod 17A, and that the ram may also be a hydraulic or pneumatic ram connected with a source of pressurized fluid through an electrically operated valve, or may be an electric solenoid having an extensible plunger.

Figure 3:
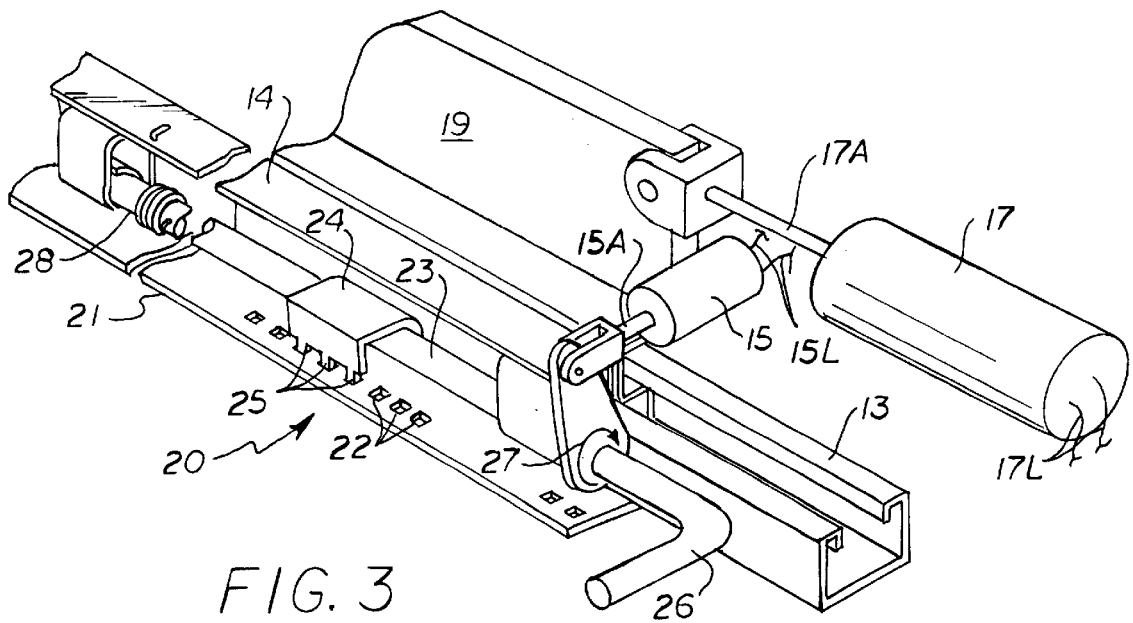
FIG. 3 is a perspective view of the seat slide track release mechanism of the present invention.

With reference to FIG. 3, the fore and aft seat adjuster of a typical seat 10 is shown. The seat adjuster includes a lower rail 13 which is attached to the vehicle body through a pedestal or or other mount. The lower rail 13 is secured in a fore and aft direction along the longitudinal axis of the vehicle. An upper rail 14 is slidably mounted to the lower rail 13 for fore and aft movement thereon. A vehicle seat typically has a pair of lower rails and a pair of upper rails, one set at each side of the seat. A riser 19 typically extends upward from each upper rail and the seat cushion and backrest are mounted to the risers.

A latch mechanism 20 holds the upper rail 14 in a given position relative to the lower rail 13. The latch mechanism includes a lower plate 21 attached to the lower rail 13. The latch plate 21 has an array of apertures 22. A rod 23 rotatably mounted to the upper rail 14 carries a latch pawl or latch member 24 having a plurality of teeth 25 which are to be received in the apertures 22 in the latch plate 21. The latch member 24 is typically movable by manually rotating the rod 23 between a latched position and a released position by means of a pivot lever 26 fixed to the rod and extending radially therefrom. In the latched position, the teeth 25 are engaged in the apertures 22 of the latch plate 21 to hold the upper rail 14 in a fixed position relative to the lower rail 13. By rotating the rod 23 in the direction of the arrow 27, the latch member 24 is moved to the released position in which the teeth are disengaged, and the seat may slide fore and aft. A spring 28 coupled to the rod 23 or pivot lever 26 biases the pivot lever, rod, and latch plate to a normally engaged or latched position.

In accordance with the present invention, the outer end of the plunger 15A of the track slide release actuator 15 is connected to the rod 23 to rotate the rod to the released position upon activation of the actuator. The extendible piston rod 17A of the ram 17 is connected to the riser 19 adjoined to the upper rail 14. When the electrical signal is sent to the airbag inflator assembly to deploy the airbag, the rod 23 is simultaneously moved to rotate the latch member 24 to the released position and the seat is free to move relative to the vehicle. At the same time, the same electrical signal actuates the ram 17 to propel the seat assembly rearward. It should be understood that a ram may be connected on each side of the seat assembly or may be connected at other locations to the seat to propel the seat rearward.

Figure 5:
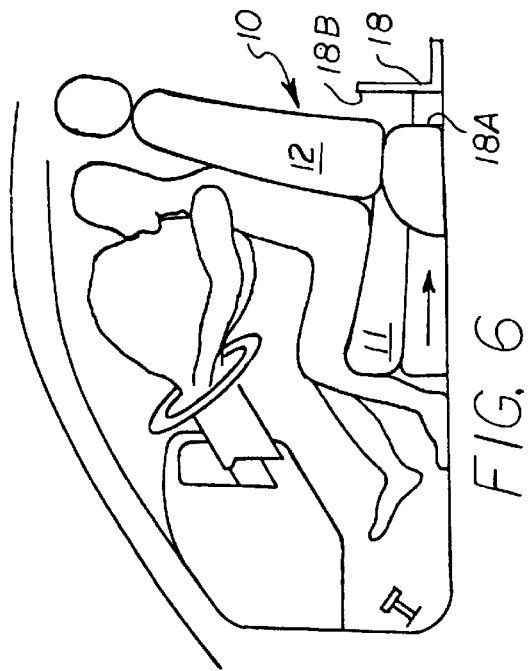
FIG. 5 is a side elevation showing an occupant seated in a vehicle seat prior to deployment of an airbag.
Figure 6:
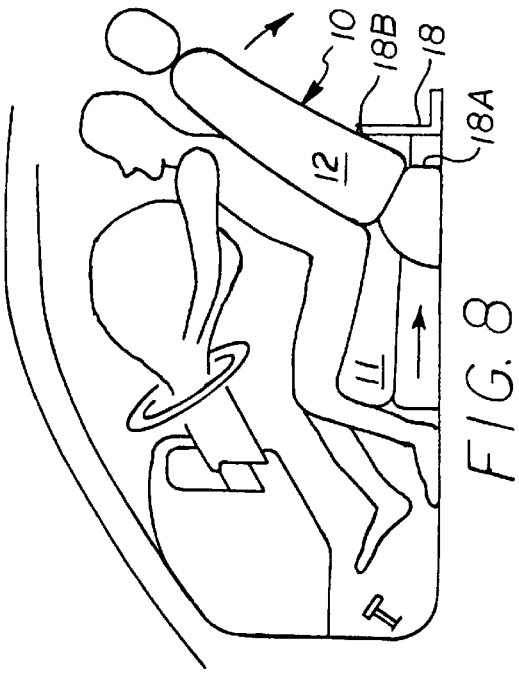
FIG. 6 is a side elevation showing an occupant in a vehicle seat equipped with the slide track release mechanism being moved rearwardly during deployment of the airbag.

FIG. 5 shows an occupant seated in the vehicle seat 10 which is adjusted and latched in the drivers normal driving position prior to deployment of an airbag. As shown in FIG. 6, when the airbag A inflates, the seat 10 is not fixed and is propeled rearward by the ram 17 (FIGS. 1 and 3) and, should the occupant still be close to the airbag when it started to deploy, the seat and occupant offers little resistance against the explosive force of the inflation of the airbag itself. The lower stop surface 18A of the stop member 18 controls the extent of the rearward movement of the seat assembly 10 to prevent injury to any rear seat passengers. It should be understood that in some installations the ram may be omitted and, should the occupant be too close to the airbag when it started to deploy, the unlatched seat offers little resistance to the explosive force of the inflation of the airbag itself, and the seat and occupant may be moved rearwardly by the airbag as it inflates.

Figure 4:
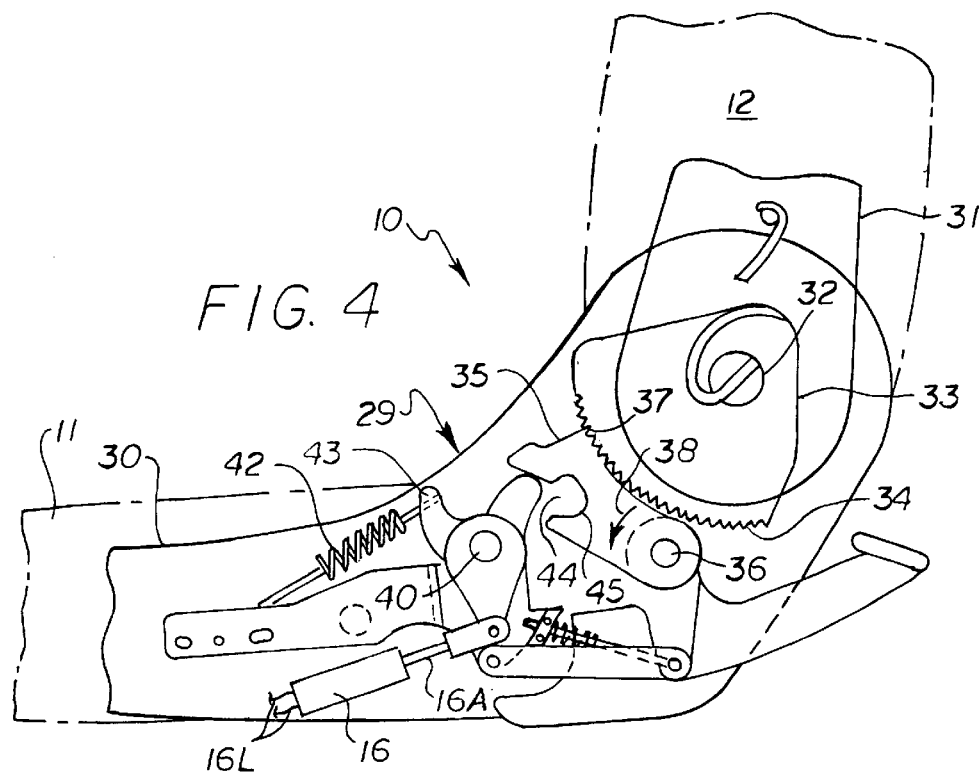
FIG. 4 is a side elevation of the backrest release mechanism of the present invention.

Referring now to FIG. 4, a typical backrest recliner mechanism 29 is shown. The seat 10 includes a riser 30 similar to the riser 19 shown in FIG. 3 to which the seat cushion 11 and backrest 12 are attached. The backrest includes a backrest frame 31 that is pivotally connected to the riser for rotation about a pivot pin 32.

The backrest frame 31 has a sector gear 33 which is affixed to the frame. The sector gear 33 has a plurality of teeth 34 about a portion of its arcuate periphery. A latch member or pawl 35 is pivotally attached to the riser 30 for pivotal movement about a pivot 36. The pawl 35 has a plurality of teeth 37 along its arcuate periphery complementary to the teeth 34 of the sector gear 33. When the teeth 37 of the pawl 35 engage the teeth 34 of the sector gear 33 the backrest frame 31 is held in place. When the pawl 35 is rotated counter-clockwise, as viewed in FIG. 4 in the direction of the arrow 38, the pawl 35 is released from the sector gear 33, enabling the sector gear and backrest 12 to rotate about the pivot pin 32.

The pawl 35 is held in place by a cam 39 pivotally mounted to the riser 30 for rotation about a pivot pin 40. The cam 39 is generally Y-shaped having three legs. The leg 41 engages the pawl 35 on an edge surface opposite from the teeth 37 and holds the pawl in an engaged position with the sector gear 33. A spring 42 coupled to the cam leg 43 biases the cam 39 in the counter-clockwise direction, as viewed in FIG. 4 to maintain the leg 41 in engagement with the pawl 35.

To adjust the angular position of the backrest 12, the cam 39 is typically pivoted between a latched position and a released position by means of a pivot lever fixed to the cam (not shown). When the cam 39 is moved in the clockwise direction in opposition to the spring 42, the leg 41 is lowered into a recessed portion 44 of the pawl 35, enabling the pawl to rotate to the released position due to gravity. To insure rotation of the pawl, the cam leg 41 will contact the release leg 45 of the pawl 35, forcing the pawl to rotate to the released position. Upon release of the lever 43, the spring 42 will return the cam to the locked position in which it forces the pawl 35 into engagement with the sector gear 33 to hold the backrest in the adjusted position.

In accordance with the present invention, the outer end of the plunger 16A of the backrest release actuator 16 is connected to the pivot lever 43 to rotate the cam 39 and pawl 35 to the released position upon activation of the actuator. When the electrical signal is sent to the airbag inflator assembly to deploy the airbag, the plunger 16A is simultaneously moved to rotate the cam 39 and pawl 35 to the released position and the backrest is free to pivot relative to the seat cushion 12.

Figure 7:
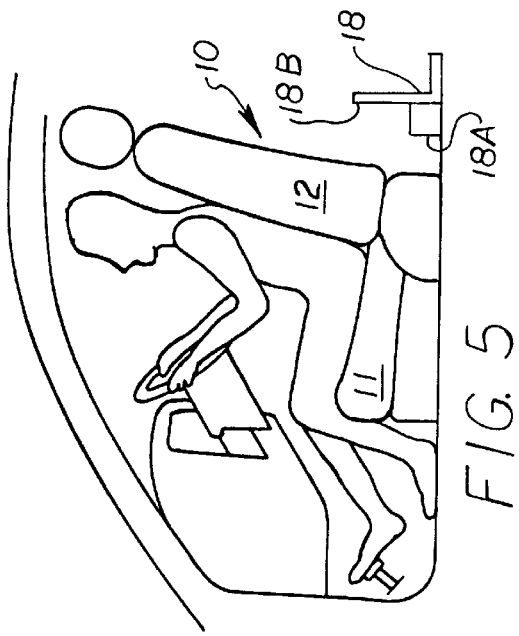
FIG. 7 is a side elevation showing an occupant in a vehicle seat equipped with the backrest release mechanism being pivoted rearwardly during deployment of the airbag.

FIG. 7 shows an installation wherein the seat assembly is equipped with only the backrest release. As shown in FIG. 7, when the airbag A inflates, the backrest 12 is not fixed and offers little resistance against the explosive force of the inflation of the airbag itself, and should the occupant be too close to the airbag when it started to deploy, the backrest and occupant may pivoted rearwardly by the airbag as it inflates. The upper stop surface 18B of the stop member 18 controls the extent of the pivotal rearward and downward movement of the backrest 12 to prevent injury to any rear seat passengers.

Figure 8:
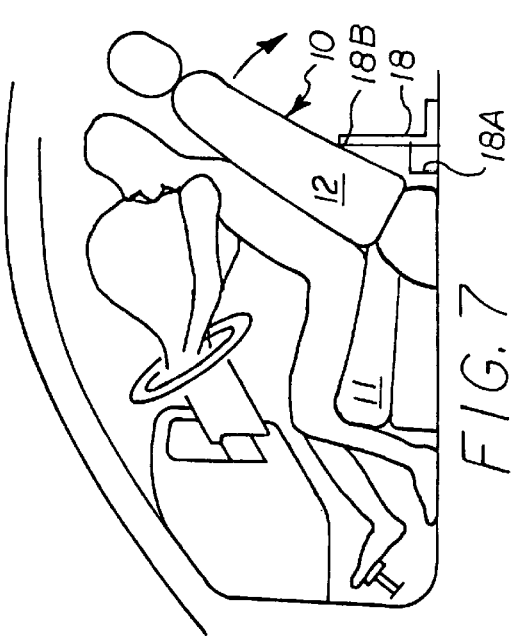
FIG. 8 is a side elevation showing an occupant in a vehicle seat equipped with both the slide track release mechanism and backrest release mechanism wherein the seat cushion and occupant are moved rearwardly and the backrest and occupant are pivoted rearwardly as the airbag inflates.

It should be understood that the vehicle seat may be provided with either the slide track release or with the backrest release, or, as shown in FIG. 8, the seat may be provided with both. As shown in FIG. 8, when the airbag A inflates, neither the seat cushion 11 nor the backrest 12 is fixed and the seat assembly is propeled rearward by the ram 17 (FIGS. 1 and 3) and, should the occupant still be close to the airbag when it started to deploy, the seat, backrest and occupant offer little resistance against the explosive force of the inflation of the airbag itself. The lower stop surface 18A of the stop member 18 controls the extent of the rearward movement of the seat assembly 10 and the upper stop surface 18B controls the extent of the pivotal rearward and downward movement of the backrest 12 to prevent injury to any rear seat passengers.

While this invention has been described fully and completely with special emphasis upon preferred embodiments, it should be understood that within the scope of the appended claims the invention may be practiced otherwise than as specifically described herein.

What is claimed is:

1. An airbag seat release system adapted to be connected with an airbag deployment circuit that supplies an electrical signal to an airbag inflator mechanism which deploys an airbag in a vehicle to release a front seat mounted in the vehicle and propel it rearwardly upon simultaneous deployment of the airbag, the front seat being mounted in the vehicle by a pair of fixed rails secured to the vehicle and a pair of slide rails secured to the seat and slidably connected with the fixed rails for relative fore and aft sliding movement thereon, the airbag seat release system comprising:

latch actuator means electrically connected with the airbag deployment circuit to be activated simultaneously upon an electrical signal being supplied to the airbag inflator mechanism by said airbag deployment circuit;

seat latch means connected with said latch actuator means and being movable between a normally latched position preventing movement of said seat and a released position allowing movement of said seat relative to the vehicle, said seat latch means carried by one of the said fixed and slide rails and movable to engage the other one of said fixed and slide rails in said latched position to prevent relative sliding movement between said fixed rails and said sliding rails, and movable to disengage said other one of said fixed and slide rails to enable relative sliding movement between said fixed rails and said sliding rails in said released position;

seat propelling means operatively connected with said seat and electrically connected with the airbag deployment circuit to be activated simultaneously upon said electrical signal being supplied to said airbag inflator mechanism by said airbag deployment circuit; and stop means at a rearward end of said fixed rails having a stop surface disposed to control the extent of rearward travel of said slide rails; wherein said latch actuator means and said seat propelling means are activated simultaneously responsive to said electrical signal being supplied to said airbag inflator mechanism to move said latch means to said released position allowing said seat to move relative to said vehicle and said seat propelling means to propel said seat in its said released position rearwardly relative to said vehicle as said airbag is deployed to prevent injury of an occupant of said seat by the inflation of the airbag; and said stop means controls the extent of rearward travel of said slide rails.

2. An airbag seat release system adapted to be connected with an airbag deployment circuit that supplies an electrical signal to an airbag inflator mechanism which deploys an airbag in a vehicle to release a front seat mounted in the vehicle to move upon simultaneous deployment of the airbag, the front seat having a lower generally horizontal seat cushion section and a backrest section extending upwardly from a rear end of the seat cushion section and pivotally mounted for rotation about a lateral axis to adjust the angular position of said backrest section relative to the seat cushion section, the airbag seat release system comprising:

latch actuator means electrically connected with the airbag deployment circuit to be activated simultaneously upon the electrical signal being supplied to the airbag inflator mechanism by said airbag deployment circuit; and a backrest latch mechanism connected with said latch actuator means and carried by one of the said seat cushion and backrest sections and movable to engage the other one of said seat cushion and backrest sections in a normally latched position to prevent rotation of said backrest section relative to said seat cushion section, and movable to disengage said other one of said seat cushion and backrest sections to enable rotation of said backrest section relative to said seat cushion section in a released position; and stop means disposed rearwardly of said backrest section having a stop surface positioned to control the extent of pivotal movement of said backrest section; wherein said latch actuator means is activated simultaneously responsive to said electrical signal being supplied to the inflator mechanism to move said backrest latch mechanism to said released position allowing said backrest section to pivot relative to said seat cushion section as said airbag is deployed to prevent injury of an occupant of said seat by the inflation of the airbag; and said stop means controls the extent of pivotal movement of said backrest section.

3. An airbag seat release system adapted to be connected with an actuator deployment circuit that supplies an electrical signal to an airbag inflator mechanism which deploys an airbag in a vehicle to release a front seat mounted in the vehicle and a backrest section extending upwardly from a rear end thereof and propel the seat rearwardly upon simultaneous deployment of the airbag, the front seat having a lower generally horizontal seat cushion section mounted in the vehicle by a pair of fixed rails secured to the vehicle and a pair of slide rails secured to the seat cushion section slidably connected with the fixed rails for relative for and aft sliding movement thereon and the backrest section extending upwardly from a rear end of the seat cushion section pivotally mounted for rotation about a lateral axis to adjust the angular position of said backrest section relative to the seat cushion section, the airbag seat release system comprising:

latch actuator means electrically connected with the airbag deployment circuit to be activated simultaneously upon the electrical signal being supplied to the airbag inflator mechanism by said airbag deployment circuit;

a rail latch mechanism connected with said latch actuator means carried by one of the said fixed and slide rails and movable to engage the other one of said fixed and slide rails in a normally latched position to prevent relative sliding movement between said fixed rails and said sliding rails, and movable to disengage said other one of said fixed and slide rails to enable relative sliding movement between said fixed rails and said sliding rails in said released position;

seat propelling means operatively connected with at least one said seat slide rail and electrically connected with the airbag deployment circuit to be activated simultaneously upon said electrical signal being supplied to said airbag inflator mechanism by said airbag deployment circuit; and a backrest latch mechanism connected with said latch actuator means carried by one of the said seat cushion and backrest sections and movable to engage the other one of said seat cushion and backrest sections in a normally latched position to prevent rotation of said backrest section relative to said seat cushion section, and movable to disengage said other one of said seat cushion and backrest sections to enable rotation of said backrest section relative to said seat cushion section in said released position; and stop means at a rearward end of said fixed rails having a lower stop surface disposed to control the extent of rearward travel of said slide rails and an upper stop surface disposed to control the extent of pivotal movement of said backrest section; wherein said latch actuator means and said seat propelling means are activated simultaneously responsive to said electrical signal being supplied to said airbag inflator mechanism to move said rail latch mechanism and said backrest latch mechanism to their respective said released position allowing said seat cushion section to move relative to said vehicle and said backrest section to pivot relative to said seat cushion section and propel said seat in its said released position rearwardly relative to said vehicle as said airbag is deployed to prevent injury of an occupant of said seat by the inflation of the airbag; and said stop means controls the extent of rearward travel of said slide rails, and its said upper stop surface controls the extent of pivotal movement of said backrest section.

* * * * *